A. S. SPIEGEL.
DISPLAY DEVICE FOR LANTERNS.
APPLICATION FILED FEB. 9, 1911. RENEWED JAN. 22, 1913.
1,066,765.  
Patented July 8, 1913.  
2 SHEETS—SHEET 1.
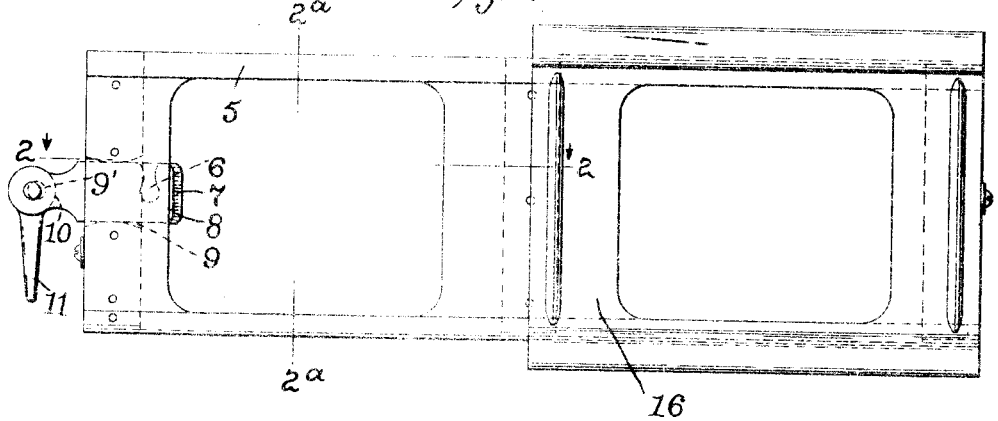
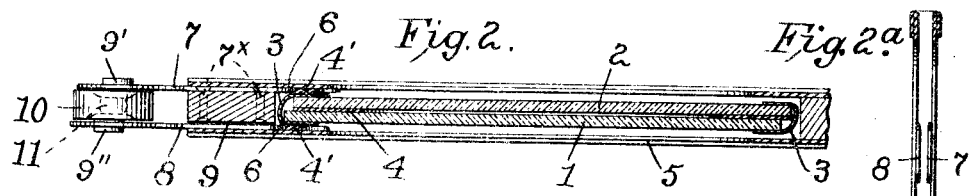
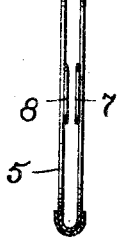
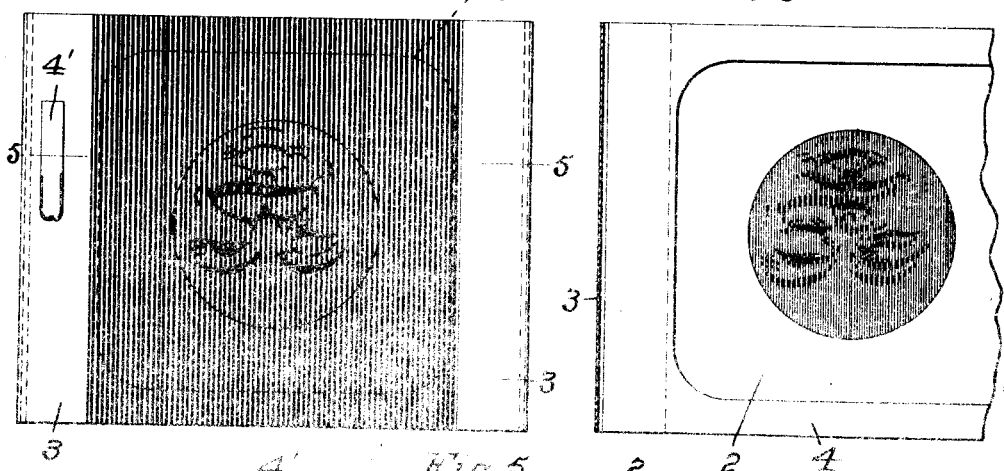
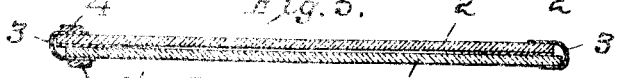
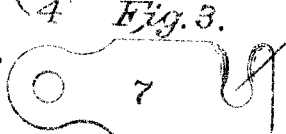
Attest:  
Ewd L. Tolson  
EwSaxton
Inventor:  
Alexander S. Spiegel  
by Spear, Middleton, Donaldson & Spear  
Atty's A. S. SPIEGEL.
DISPLAY DEVICE FOR LANTERNS.
APPLICATION FILED FEB. 9, 1911. RENEWED JAN. 22, 1913.

1,066,765.

Patented July 8, 1913.
2 SHEETS—SHEET 2.

Inventor:
Alexander S. Spiegel, ically.
UNITED STATES PATENT OFFICE.

ALEXANDER S. SPIEGEL, OF CHICAGO, ILLINOIS, ASSIGNOR OF TWO-THIRDS TO ROBERT GLENDINNING, OF CHICAGO, ILLINOIS.

DISPLAY DEVICE FOR LANTERNS.

1,066,765.  Specification of Letters Patent.  Patented July 8, 1913.

Application filed February 9, 1911, Serial No. 607,667. Renewed January 22, 1913. Serial No. 743,652.

*To all whom it may concern:*

Be it known that I, ALEXANDER S. SPIEGEL, a citizen of the United States, residing at Chicago, Cook county, State of Illinois, have invented certain new and useful Improvements in Display Devices for Lanterns, of which the following is a specification.

One object of my invention is to provide a composite lantern slide or display device for use, for instance, in moving picture shows, and also to provide a simple form of operating means for said slide, or display device, whereby moving picture effects may be secured.

The invention consists in the features and combinations and arrangement of parts hereinafter described and particularly pointed out in the claims.

Figure 6:
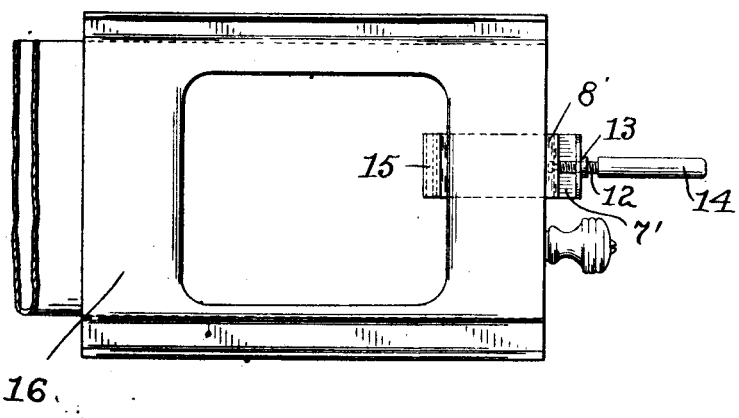
Figure 7:
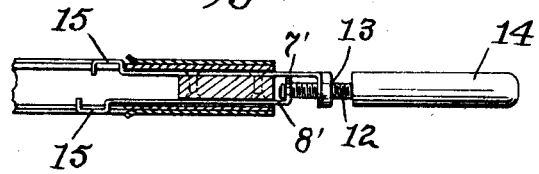
Figure 8:
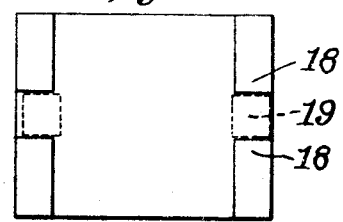

In the drawings:—Figure 1 is a side view of the carrier for the slide and with operating mechanism combined therewith; Fig. 2 is an enlarged sectional view substantially on the line 2—2 of Fig. 1, and with the slide in place. Fig. 2ª is a sectional view on line 2ª 2ª of Fig. 1; Fig. 3 is a view of one of the arms for controlling the slide; Fig. 4 is a face view of the slide or display device; Fig. 4ª is a view of the picture carrying member; Fig. 5 is a sectional view on line 5—5 of Fig. 4 with the members in a different position from that of Fig. 2. Figs. 6 and 7 are views of a modification, being respectively a side view and a sectional view; Fig. 8 is a face view of one of the members of a modified slide.

In these drawings, 1, 2, are the members of the composite lantern slide composed of glass or other transparent or translucent material, one member carrying a grating or screen composed of parallel lines, preferably photographed thereon, and the other member consisting of a plate having thereon groups of marks which make the different views of the object or person when the plate is shifted into different positions in relation to the screen section. These plates or members are connected together by flexible or hinge pieces 3 at their vertical edges, one of said connecting pieces being at each end of the display device or slide. These flexible connections are secured to the transparent members by cement, and they provide connections which will allow relative movement of one plate or member in respect to the other in one direction, while at the same time the members will be held against displacement in the other direction, so that as the position of the plates or members changes longitudinally, the groups of markings or broken lines will register properly with the open spaces between the opaque lines of the screen to produce the picture with an accurately defined outline. This display device or slide consisting of the two transparent plates or members connected by the hinge or flexible material at its opposite ends provides a lantern slide or display device which may be readily handled as one body, and in which the alinement of one member in respect to the other will always be maintained, while at the same time permitting one member to move in relation to the other. In order to prevent one member or plate from bearing on the other and having a rubbing effect thereon, I place between the plates a distance piece 4 of thin paper which keeps the plates slightly separated, and this may also serve as a mat. This slide is adapted to be placed in a carrier like that used in moving picture machines, and this carrier, in the construction of its framework, is substantially of standard pattern, having, however, my improvement mounted thereon for operating the slide so as to cause the above described relative movement between its sections or members. It will be understood that when the slide is placed in the carrier and properly connected up, the carrier is placed in the lantern such as is used in moving picture shows, and then by operating the slide as hereinafter described, the desired effect will be produced. For this purpose each slide is provided with means by which it may be operated, and I have shown as one form of such means lugs 4' on the outer sides of the plates near one end. The slide is placed in the carrier shown generally at 5, by inserting it through the open top thereof, and in this movement the lugs 4' engage recesses 6 in the arms or plates 7 and 8, the former being fixed at 7ˣ to the carrier frame and the latter being mounted in said frame to move slightly in a direction longitudinally of the said frame. Thi˟ plate or arm 8 is therefore guided in a way 9 formed in the frame. The fixed and movable arms project beyond the outer side of the frame, and in the fixed arm is mounted the journal 9' of a disk 10 which is provided with another journal pin 9'', this being eccentric to the pin 9' and mounted in the end of the movable plate or arm. This disk has a handle 11 by which it may be operated, and when turned it will move the arm or plate 8 in relation to the fixed plate, and thus the member or section of the display device or slide which engages the movable arm 8 will be shifted in relation to the other plate, which is held by the fixed arm.

It will be understood that means other than the lugs and the recessed arms may be employed for connecting the members of the slide with the operating means. In the form shown, the slide is connected with the controlling means by the act of inserting the slide into the carrier.

As illustrating the fact that forms of operating means may be employed other than that shown in Figs. 1 and 2, reference is had to Figs. 6 and 7 in which the movable operating arm 8' has a swivel connection with a screw 12, which passes through a threaded bearing 13 on the fixed arm so that, by turning the handle 14, the screw is turned and the arm 8' is thus moved in relation to the arm 7'. The arms in this instance instead of having recesses like those first described, have bent or hooked ends 15 to engage suitable projections on the members of the slide, but in this case also the plates of the slide are connected with the controlling and operating arms by the same act of inserting the slide in the carrier. In both of these forms above described, the carrier slides in a guide frame 16, which forms a part of the fixed frame of the lantern, or moving picture machine.

I have shown mechanism for giving one member of a slide movement relative to the other, and whether this other plate is movable or fixed is within the spirit of my invention.

My invention in one aspect includes a carrier for a composite slide, the members of which may be placed in or removed from the carrier, said carrier having means for effecting a relative movement of the members of the slide. The slide I prefer to form of members or plates connected together, as above described, but I do not limit myself in this respect.

The screen may carry a portion of the picture or not, as desired.

Instead of forming the flexible connection between the members of the slide, as shown in Figs. 2, 3 and 4, I may guide one member upon the other by means of pieces of paper 18 fixed to the inner face of one member, forming a guideway receiving a piece of paper or other material fixed to the opposing face of the other member, so that while relative movement is permitted in one direction, the members will be held against movement in the other direction. Fig. 8 illustrates one of these members and the dotted lines at 19 indicate the guiding pieces on the other member. In this form, the slide members are separable, one from the other, or the members may be permanently connected together at one end by a hinge piece or flexible strip as above described, while at the other end the plates may have between them the guiding pieces just described, my purpose in illustrating this form being to show that the composite slide may be varied without departing from my invention.

In the above described forms of the slide, the plates are combined so that one is guided in relation to the other to secure proper registration between the screen and the picture marks, in the form first described, the guiding means being the flexible connections between the plates.

With moving picture machines with which my slides are intended to be used, the material must be such as to withstand the intense heat from the source of light, and I therefore employ glass or other refractory material, and being in the form of rigid or non-flexible plates, they can be guided one in relation to the other and lend themselves to practical combination or association one with the other, as, for instance, in the cases above mentioned, wherein they are connected by the flexible piece at one or both ends or whereby one is guided on the other.

I do not consider it necessary to specifically describe the various changes which may be made in the elements for carrying my invention into effect, sufficient to say that various modifications may be made within the scope of the appended claims.

I claim as my invention:—

1. A composite lantern slide consisting of a transparent screen member having parallel lines with spaces between, and a transparent picture carrying member relatively movable, and made up of lines and spaces, substantially as described.

2. A lantern slide for use in moving picture machines and the like consisting of a screen carrying member and a picture carrying member relatively movable and composed of transparent refractory material, substantially as described.

3. A composite lantern slide for use in moving picture machines and the like, consisting of a screen carrying member and a picture carrying member relatively movable and composed of transparent refractory material, and means carried by the members consisting of the flexible pieces connecting the edges of the members at opposite ends for guiding one in relation to the other, substantially as described.

4. A display device comprising two transparent plates one of which is a screen member and the other a picture carrying member, said members being movable one on the other in one direction and hinge connections at the opposite ends of said plates, consisting of the flexible pieces attached to the transparent plates to connect them at both ends but allow movement of one on the other, said plates being adapted to be handled as one body, substantially as described.

5. A display device comprising a glass screen member and a glass picture carrying member with a spacing member between them and bearing thereon, said screen and picture members having relative movement, and a flexible connection between the glass plates at the opposite ends thereof, substantially as described.

6. A display device comprising a transparent screen member and a transparent picture carrying member, one of said members being movable in relation to the other, flexible connections between opposite ends of said members, and means on one of the said members for effecting said movement, substantially as described.

7. A display device comprising a screen member and a picture carrying member movable one in relation to the other, and means on one of the members for interlocking with controlling means on a carrier for effecting said relative movement when the display device is placed in said carrier, substantially as described.

8. A display device comprising two members, one a screen and the other a picture carrying member, with means carried by the said members whereby one member is guided in relation to the other, said members having means for connecting with controlling means on a carrier, substantially as described.

9. A display device comprising a screen member and a picture carrying member, a carrier, controlling means on the carrier and means on each member for interlocking with the said controlling means, said members being removable and replaceable in respect to the carrier, substantially as described.

10. A display device comprising a screen member and a picture carrying member relatively movable, a carrier for receiving said members having means to hold one member against movement, and controlling means on the carrier with which the other member removably engages to be operated thereby in relation to the first member, substantially as described.

11. A display device comprising a screen member and a picture carrying member, a carrier, controlling means on the carrier for securing a relative movement of one member in relation to the other, and interlocking means carried by the members for removably engaging said controlling means, substantially as described.

12. A lantern slide consisting of a screen member and a picture carrying member, connected together by flexible strips at their opposite ends to be handled as one body and one movable in relation to the other, and a carrier for said slide holding the same removably, substantially as described.

13. In combination a display device or slide consisting of a screen member and a picture carrying member, with means for guiding one member in relation to the other, and a carrier for said members having an opening through which said members are simultaneously removable, substantially as described.

14. In combination a lantern slide consisting of a screen member and a picture carrying member, connected together by flexible strips at their opposite ends to be handled as one body, a carrier holding said slide removably, and means for effecting relative movement of one of said members of the slide in relation to the other while in the carrier, substantially as described.

15. In combination a carrier having arms with recesses and a composite slide consisting of a screen member and a picture carrying member each having a projection to interlock with the recessed arms, and means for moving one arm relatively to the other, substantially as described.

16. In combination a carrier having arms with recesses and a composite slide consisting of a screen member and a picture carrying member each having a projection to interlock with the recessed arms, and means for moving one arm relatively to the other, said means including the eccentric device, substantially as described.

17. In combination a lantern slide composed of a screen member and a picture carrying member attached together but capable of relative movement, a carrier for receiving the composite slide removably, controlling means on the carrier for securing a relative movement between the members of the slide, and means on one member of the slide for interlocking with the controlling means as the slide is inserted into the carrier, substantially as described.

18. A carrier for composite lantern slides consisting of screen and picture members, said carrier having one portion for receiving and holding against movement one member of the slide, and having an operating member to interlock with the other member of the slide as the same is inserted into the carrier, said operating member securing a relative movement between the members of the slide, said composite slide being removable from the carrier as one body, substantially as described.

19. In combination a composite slide composed of a screen member and a picture carrying member, connected by flexible strips at their opposite edges to hold them against displacement while allowing movement in one direction, a carrier for removably holding the slide and means carried by one of the members through which relative movement of the members may be effected, substantially as described.

In testimony whereof, I affix my signature in presence of two witnesses.

ALEXANDER S. SPIEGEL.

Witnesses:
WALTER DONALDSON,
BENNETT S. JONES.